United States Patent
Bouchard (10) Patent No.: US 11,740,120 B2
(45) Date of Patent: *Aug. 29, 2023

(54) METHOD AND APPARATUS TO MONITOR A RESERVOIR OR A STRUCTURE

(71) Applicant: Technologies Intelia Inc., Joliette (CA)

(72) Inventor: Claude Bouchard, Lanoraie (CA)

(73) Assignee: TECHNOLOGIES INTELIA INC., Joliette (CA)

( * ) Notice: Subject to any disclaimer, the term of this patent is extended or adjusted under 35 U.S.C. 154(b) by 78 days.

This patent is subject to a terminal disclaimer.

(21) Appl. No.: 17/161,238

(22) Filed: Jan. 28, 2021

(65) Prior Publication Data

US 2021/0255029 A1   Aug. 19, 2021

Related U.S. Application Data

(63) Continuation of application No. 16/288,620, filed on Feb. 28, 2019, now Pat. No. 10,921,178, which is a
(Continued)

(51) Int. Cl.
*G01G 21/23* (2006.01)
*G01G 19/52* (2006.01)
(Continued)

(52) U.S. Cl.
CPC .......... *G01G 21/23* (2013.01); *G01G 13/024* (2013.01); *G01G 19/52* (2013.01); *G01G 23/02* (2013.01); *E04H 7/22* (2013.01)

(58) Field of Classification Search
CPC ...... G01G 21/23; G01G 13/024; G01G 19/52; G01G 23/02; E04H 7/22
(Continued)

(56) References Cited

U.S. PATENT DOCUMENTS 5,313,022 A * 5/1994 Piroozmandi .......... G01G 3/141
73/862.045
5,770,823 A * 6/1998 Piroozmandi .......... G01G 19/52
177/144
(Continued)

FOREIGN PATENT DOCUMENTS

WO     2017/175050 A1    10/2017

OTHER PUBLICATIONS

International Preliminary Report on Patentability dated Jan. 28, 2019 in the corresponding patent application PCT/CA2017/051015.
(Continued)

*Primary Examiner* — Jacques M Saint Surin
(74) *Attorney, Agent, or Firm* — Brouillette Legal Inc.; Robert Brouillette (57) ABSTRACT

A method and apparatus to monitor the weight of a silo or tank is disclosed. The system is adapted to be attached to a leg of the silo and comprises a load cell, a support member anchored to the ground and a lifting device attached to the load cell and to the support member. The load cell comprises two extremities that are attached to the silo leg and comprises an aperture there between. The aperture is preferably threaded to receive the lifting device, such as a bolt. The bolt is rotated using a tool as to induce a movement of the load cell along the axis of the bolt thereby lifting the load cell and the attached silo leg. Strain gauges are attached to the load cell to measure the variation in an electric or optical signal that is translated in human readable data using a monitoring device.

17 Claims, 12 Drawing Sheets

Related U.S. Application Data continuation-in-part of application No. PCT/CA2017/051015, filed on Aug. 29, 2017.

(60) Provisional application No. 62/380,556, filed on Aug. 29, 2016.

(51) Int. Cl.
*G01G 13/02* (2006.01)
*G01G 23/02* (2006.01)
*E04H 7/22* (2006.01)

(58) Field of Classification Search
USPC .............................................................. 177/1
See application file for complete search history.

(56) References Cited

U.S. PATENT DOCUMENTS

| | | | |
|---|---|---|---|
| 6,799,371 B2 * | 10/2004 | Liu | B23P 15/24 |
| | | | 700/192 |
| 7,980,129 B2 | 7/2011 | Jaeger | |
| 8,354,602 B2 * | 1/2013 | Lucas | G01G 23/3735 |
| | | | 177/229 |
| 8,581,122 B2 | 11/2013 | Jaeger | |
| 9,260,253 B2 * | 2/2016 | Naizer | B65G 43/08 |
| 9,310,243 B2 | 4/2016 | Jaeger | |
| 10,921,178 B2 * | 2/2021 | Bouchard | G01G 23/02 |

OTHER PUBLICATIONS

International Search Report dated Dec. 8, 2017 in the corresponding patent application PCT/CA2019/051015.

* cited by examiner

METHOD AND APPARATUS TO MONITOR A RESERVOIR OR A STRUCTURE

CROSS-REFERENCE TO RELATED APPLICATIONS

The present patent application claims the benefits of priority of U.S. Provisional Patent Application No. 62/380,556, entitled "METHOD AND APPARATUS TO MONITOR A RESERVOIR OR A STRUCTURE" and filed at the United States Patent and Trademark Office on Aug. 29, 2016, the content of which is incorporated herein by reference. The present patent application is a continuation patent application of the U.S. patent application Ser. No. 16/288,620, entitled "METHOD AND APPARATUS TO MONITOR A RESERVOIR OR A STRUCTURE" filed at the United States Patent and Trademark Office on Feb. 28, 2019, which is a continuation of the PCT patent application no. PCT/CA2017/051015, entitled "METHOD AND APPARATUS TO MONITOR A RESERVOIR OR A STRUCTURE" filed at the World Intellectual Property Organization on Aug. 29, 2017, the content of such patent applications being incorporated herein by reference.

FIELD OF THE INVENTION

The present invention generally relates to the field of load cells, and more particularly to devices and methods for weighting and lifting reservoir, tank, silo or other types of structures.

BACKGROUND OF THE INVENTION

Many facilities, such as cattle farms, must provide the animals an uninterrupted supply of food. This task is usually carried on with a silo containing food, such as grains. However, it occurs that the silo gets empty without the producer or the feed supplier is notified. If not resolved quickly, this situation may cause important profit loss.

A solution to this problem has been proposed by Jaeger in the U.S. Pat. No. 7,980,129 where a silo monitoring system is proposed. Such system is able to lift the silo for measuring the weight of contained material. A load cell is connected to a monitoring system that can generate alerts upon detection of abnormal activities, such as flow interruption.

The design disclosed in U.S. Pat. No. 7,980,129 discloses a mechanical connector vertically mounted to a S-type load cell. Such assembly has a length which require an increased ground clearing to lift the bin. The suspension point of such assembly requires to raise several inches from the ground and requires a beefy and large A-Frame. Such frame Inconvenient of such frame includes that the system has a very large footprint and becomes unusable when the bin is mounted on small concrete block. Also, the size and the weight of this assembly render difficult the manipulation of the heavy parts and require an important men effort during installation.

Also, the system disclosed in U.S. Pat. No. 7,980,129 requires a connector arranged to be connectable to one of the bin legs and supporting the load, which increases the complexity and costs of installation. Also, a plurality of pieces is required to properly attach the silo leg to the load cell.

Another problem frequently found, several weighing equipment for feeding and weighing animals are mounted on load cells. When a load cell fails, the replacement is often complex and requires lifting equipment which complicate the intervention.

In view of the drawbacks of prior art lifting and monitoring systems, there is thus a need for a system aiming at reducing the said drawbacks of the prior arts.

SUMMARY OF THE INVENTION

The shortcomings of the prior art are generally mitigated by providing a method and apparatus for monitoring the weight of a reservoir, tank, silo or any weighing platform by analyzing the variation in electric or optical signal of a strain gauge attached to a load cell supporting the weight of the said reservoir.

In one aspect of the present invention, a system for monitoring the weight of a silo is provided. The system comprises: a load cell, a load cell support for supporting the load cell, at least one measuring means, such as a strain gauge, attached to the load cell for measuring the deformation of the load cell, means to attach the load cell to a support element of the reservoir, such as but not limited to a silo leg. The means to attach the load cell may also allow lifting of said load cell and support element. The apparatus further comprises a monitoring device for translating the variation in the signal outputted by the measuring mean.

In a further aspect of the invention, the system for lifting a silo may comprise a raising means, such a lever mechanism, adapted to facilitate the lifting of the reservoir.

In yet another aspect of the invention, a method for monitoring the weight of a reservoir is provided. The method comprises the steps of (a) attaching a load cell to support member of the reservoir, (b) mounting at least one measuring means to the load cell, (c) lifting the load cell and the support member. The method may further comprise repeating steps (a) to (c) for each support member of the reservoir, measuring an output signal of the measuring means of each supporting member and computing variation of the output signal.

In another aspect of the invention, the support member may be lifted without lifting the load cell. Typically, in such an embodiment, the load cell is not attached to the support member.

In a further aspect of the invention, the system for monitoring the weight of a silo may comprise a load cell having two extremities, each extremity being adapted to be attached to a different supporting member of the reservoir, a support member of the system adapted to be supported by the ground, at least one measuring means attached to the load cell for measuring the deformation of the load cell and a lifting mean adapted to connect the support member of the system to the load cell between the two extremities of the load cell. The lifting device is adapted to move the load cell with regards to the support member of the system thereby lifting the supporting member of the reservoir.

In yet another aspect of the invention, the system for monitoring the weight of a container comprises a load cell having two extremities, both extremities being adapted to be attached to a supporting member of the container. The system further comprises a lifting means located between the two extremities of the load cell, the lifting means being adapted to lift the load cell and the support member of the container from the ground.

The invention aims at monitoring the actual weight and/or the variation of the weight of a reservoir or silo tank. The reservoir may contain any type of material, typically as liquid or solid material.

In one aspect of the invention, the load cell of the system is a custom designed «shear-web type» load cell. Such load cell is adapted to monitor and lift the reservoir. The said load cell is connected to shear strain gauges which are mounted to about the center of a thin web in order to measure maximum shear deformation of the steel. Off-centered load is eliminated by the configuration of the strain gauges. The electric or optical signal is monitored by an electronic circuit board and values are shown by a human machine interface. Data analysis is done to alert any problems related to the material weight residing inside the silo (ex.: silo almost empty). The disclosed invention allows the installation to be completed without the need of a crane because of its auto lifting functionality.

Using the disclosed invention, the silo is only lifted about half an inch from its initial position. This small elevation allows a secure installation and eliminates the need to disconnect any feed supply line connected to the silo.

As the load is distributed at two support locations, the device is adapted to lift heavier loads or weight than known prior art systems. Accordingly, the present system may be securely installed on fully loaded silos.

The present system typically does not require lifting machinery or specialized tools as the lifting device is integrated into the load cell.

In another aspect of the present invention, upon installing the load cell support, the load cell is connected to the silo leg and to a first portion of the load cell support. The load cell and the silo leg are then lifted using the lifting device. Once lifted, the free end of the load cell is securely connected to a second portion of the load cell support and the lifting device may be finally removed.

In yet another aspect of the invention, both extremities of the load cell are connected to the silo leg. The lifting device is connected to both the load cell and the support member connected to the ground. The lifting device is thus used to induce a movement to the load cell therefore lifting the attached silo leg. The present system aims at minimizing the installation procedure and at having a permanent lifting device on the reservoir.

Furthermore, such configurations aim at improving stability of the monitoring process of the weight of the reservoir in windy weather as the silo leg is attached to the load cell, the load cell being connected to the load cell support or the support member of the system. Preferably, the support members are anchored to the ground.

The lifting device is an integrated lifting device aiming at removing the use of machinery to lift a silo leg in a position where the load cell may be anchored to the silo leg for weight monitoring purposes.

In another aspect of the invention, a system for monitoring and supporting the weight of a structure above a surface is provided, the structure comprising at supporting members. The system comprises a load cell being attached to one of the supporting members, an anchoring member supporting the load cell, the anchoring member being attached to the surface; the anchoring member comprising a lifting mechanism adapted to upwardly or downwardly move the load cell with respect to the anchoring member and at least one mean for measuring any deformation of the load cell.

The load cell may further comprise a first and a second extremity, the first extremity being movably attached to the anchoring member and the second extremity being adapted to be freely moving. The lifting device may be adapted to upwardly and downwardly move the second extremity of the cell load with respect to the load cell support; the upward movement of the second extremity lifting the support element of the structure.

The lifting device may be adapted to be removed when the second extremity of the cell load is attached to the load cell support using an attachment means. The attachment means may be a locking pin.

The load cell may be pivotally attached to one supporting member, the lifting device being pivotally attached to the second extremity of the load cell, the load cell acting as a lever mechanism. The lifting device may further be proximal to the at least one attachment mean or the load cell may be pivotally attached to the supporting member about the center of the load cell.

The system may further comprise a monitoring device for translating the deformation of the load cell measured by the measuring mean in a signal simulating the weight of the structure.

In another aspect of the invention, a system for monitoring and supporting the weight of a structure above a surface is provided, the structure comprising at least two supporting members. The system comprises a load cell support; the load cell support being anchored to the surface, a load cell being movably attached to the load cell support; the load cell being attached to one of the supporting members, a lifting device attached to the load cell, the lifting device being adapted to upwardly or downwardly move the load cell with respect to the load cell support and at least one mean for measuring any deformation of the load cell.

The lifting device may be in between both extremities of the load cell and in between sides of the support element of the structure. The system may further comprise a monitoring device for converting the deformation of the load cell measured by the measuring mean in a signal transducing the weight of the structure. The load cell further may comprise two extremities, each extremity attached to one of the supporting members.

In yet another aspect of the invention, a system for monitoring and supporting the weight of a structure above a surface is provided, the structure comprising at least two supporting members. The system comprises a load cell support; the load cell support being anchored to the surface, a load cell being movably attached to the load cell support; the load cell comprising two extremities; each extremity being attached to a different support element of the structure, a lifting device attached to the load cell, the lifting device being adapted to upwardly or downwardly move the load cell with respect to the load cell support and at least one mean for measuring any deformation of the load cell.

The lifting device may be located in between both extremities of the load cell thereby between two different support elements of the structure. The system may further comprise a monitoring device for translating the deformation of the load cell measured by the measuring mean in a signal simulating the weight of the structure. The load cell may be a custom designed "shear-web type".

The at least one measuring means may be a shear strain gauge, such shear strain gauges may be mounted to about center of the cell load in order to measure maximum shear deformation of the cell load or the shear strain gauges may be configured to eliminate off-centred load.

The system may further comprise a data analysis system to alert any problems related to the structure weight. The structure may further be lifted about half an inch from an initial position.

In a further aspect of the invention, a system for monitoring and supporting the weight of a structure above a surface is provided, the structure comprising supporting members The system comprises a load cell support; the load cell support being anchored to the surface, a load cell comprising two extremities; a first extremity being attached to the load cell support and a second extremity supporting a lifting device, the lifting device being adapted to upwardly or downwardly move one of the supporting members with respect to the load cell support and at least one mean for measuring any deformation of the load cell.

The load of the supporting member may act as a cantilever on the load cell and the system may further comprise a monitoring device for translating the deformation of the load cell measured by the measuring mean in a signal simulating the weight of the structure.

In another aspect of the present invention, a method for monitoring and supporting the weight of a structure comprising at least one supporting element above a surface is provided, a load cell being attached to the supporting element. The method comprises using a lifting device to upwardly move the load cell with respect to a load cell support attached to the surface, measuring deformation of the load cell and calculating load of the supporting element using the deformation of the load cell.

The method may further comprise converting the measured deformation in a signal transducing the weight of the structure.

The structure may comprise more than one supporting member, the method further comprising repeating all steps for each support element of the structure.

The method may further comprise locking in a position to create a rigid connection between the support members or maintaining the load cell at a lifted position using a maintaining mean. The maintaining the load cell at a lifted position may further comprise inserting a rigid member under the load cell.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel method and apparatus to monitor the material weight contained or weight of a reservoir, a tank, a silo or any other types of structures will be described hereinafter. Although the invention is described in terms of specific illustrative embodiment, it is to be understood that the embodiment described herein are by way of example only and that the scope of the invention is not intended to be limited thereby.

In some embodiments, the method and apparatus may be provided to monitor the material weight contained in a silo tank. The material could be liquid or solid or a mixed of liquid and solid.

In this document, the present invention is presented as a device for monitoring a reservoir or a silo. One skilled in the art shall understand that the present device and method may be adapted to monitor, weight and/or lift other structures without departing from the principles of the present invention. As examples, the structures may be a system for weighting animals or animal food, transition hopper or other structures in which it may be required to weight the content or the structure itself.

The present system generally allows increasing the capacity of lifting a structure, a reservoir, a silo, etc. by a multiplication factor.

Figure 1A:
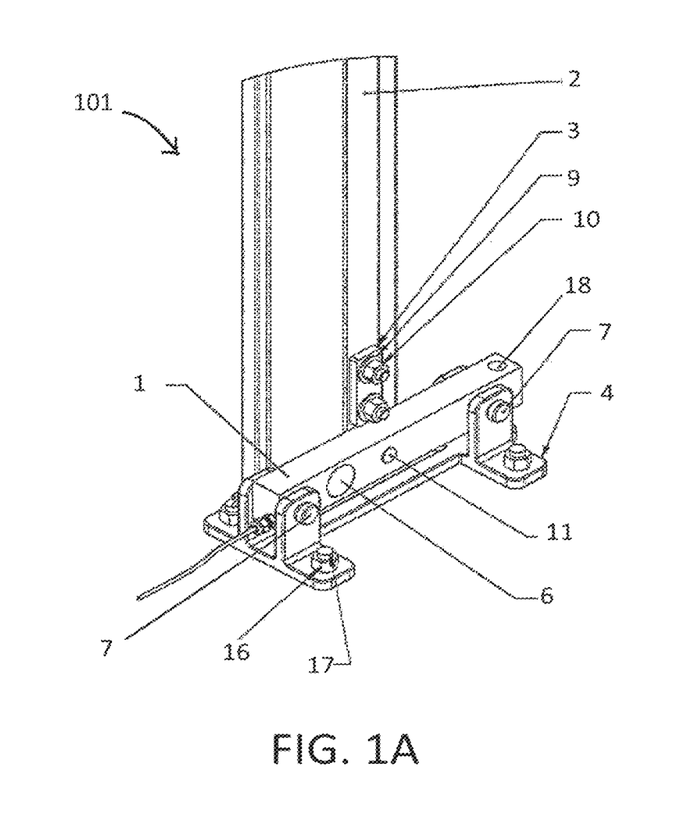
FIG. 1A is a perspective view of an apparatus to monitor the weight contained in a tank in accordance with the principles of the present invention.
Figure 1B:
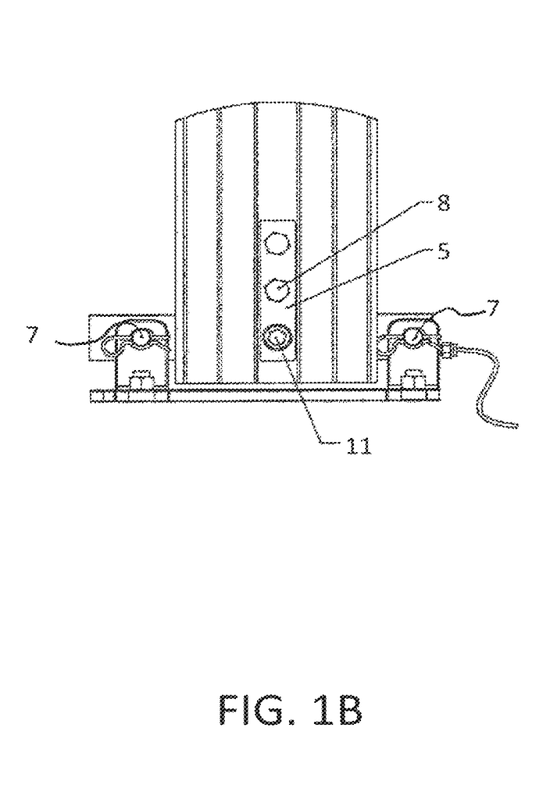
FIG. 1B is a rear view of the apparatus of FIG. 1A.
Figure 2A:
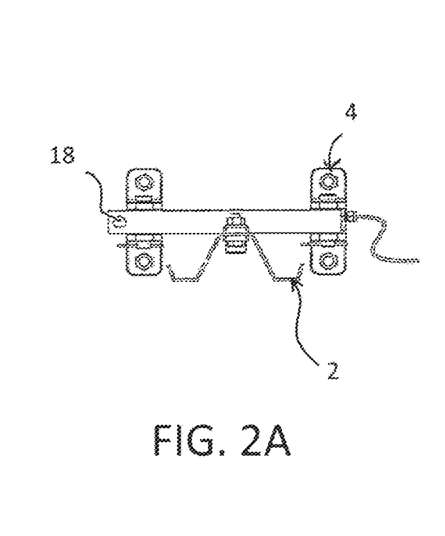
FIG. 2A is a top view of an apparatus to monitor the weight contained in a tank in accordance with the principles of the present invention shown in lifted position.
Figure 2B:
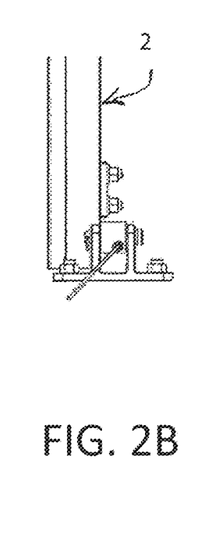
FIG. 2B is a left side view of the apparatus of FIG. 2A.
Figure 2C:
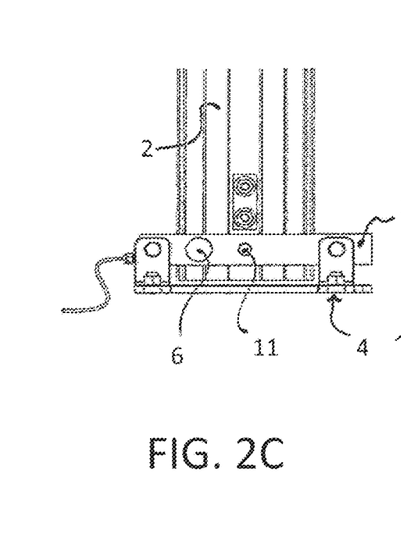
FIG. 2C is a front view of the apparatus of FIG. 2A.
Figure 2D:
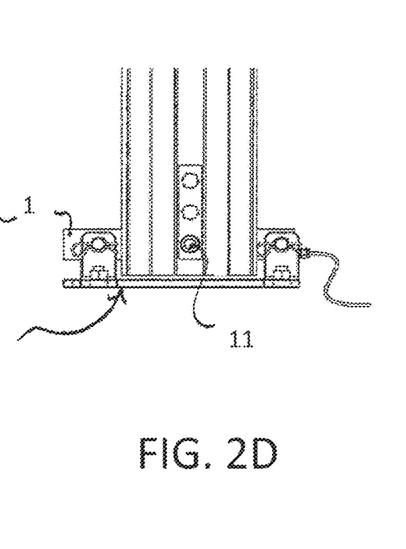
FIG. 2D is a rear view of the apparatus of FIG. 2A.
Figure 3:
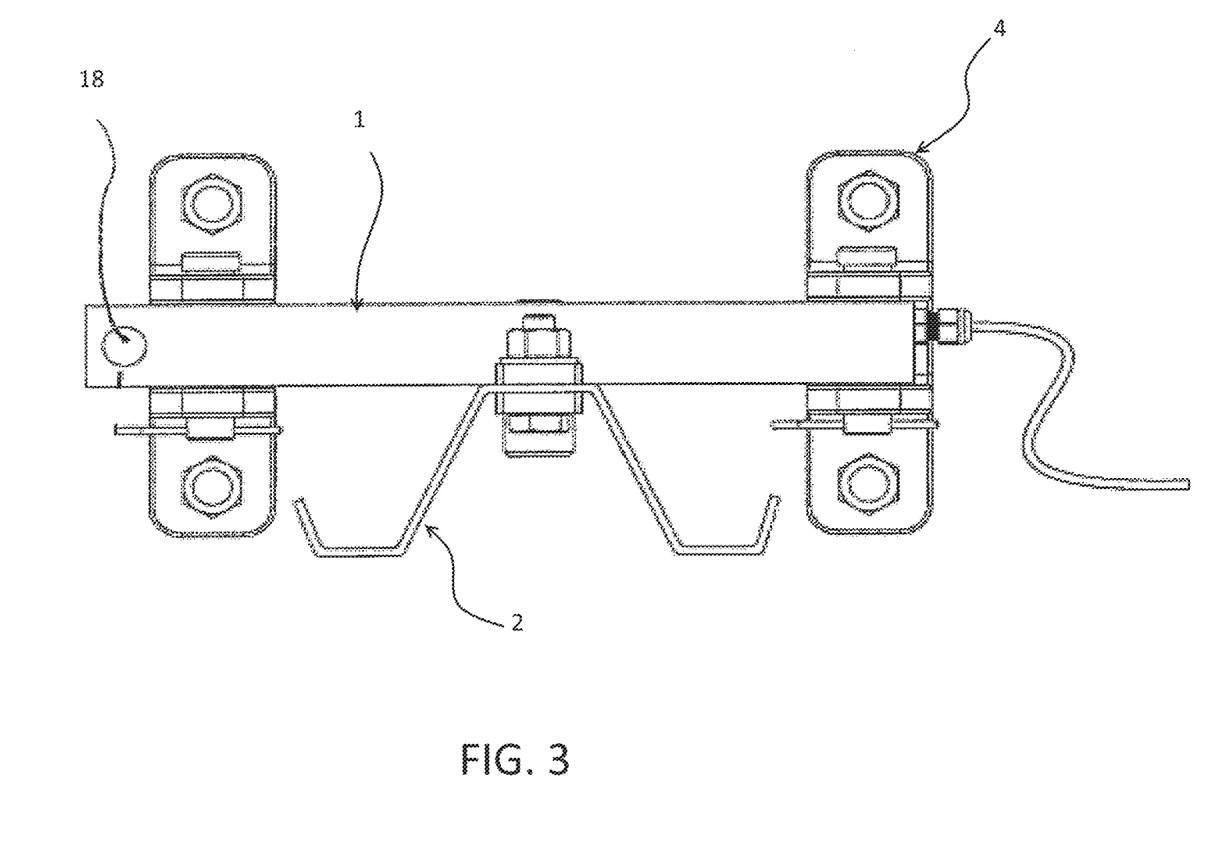
FIG. 3 is a top view of an apparatus to monitor the weight contained in a tank in accordance with the principles of the present invention.
Figure 4:
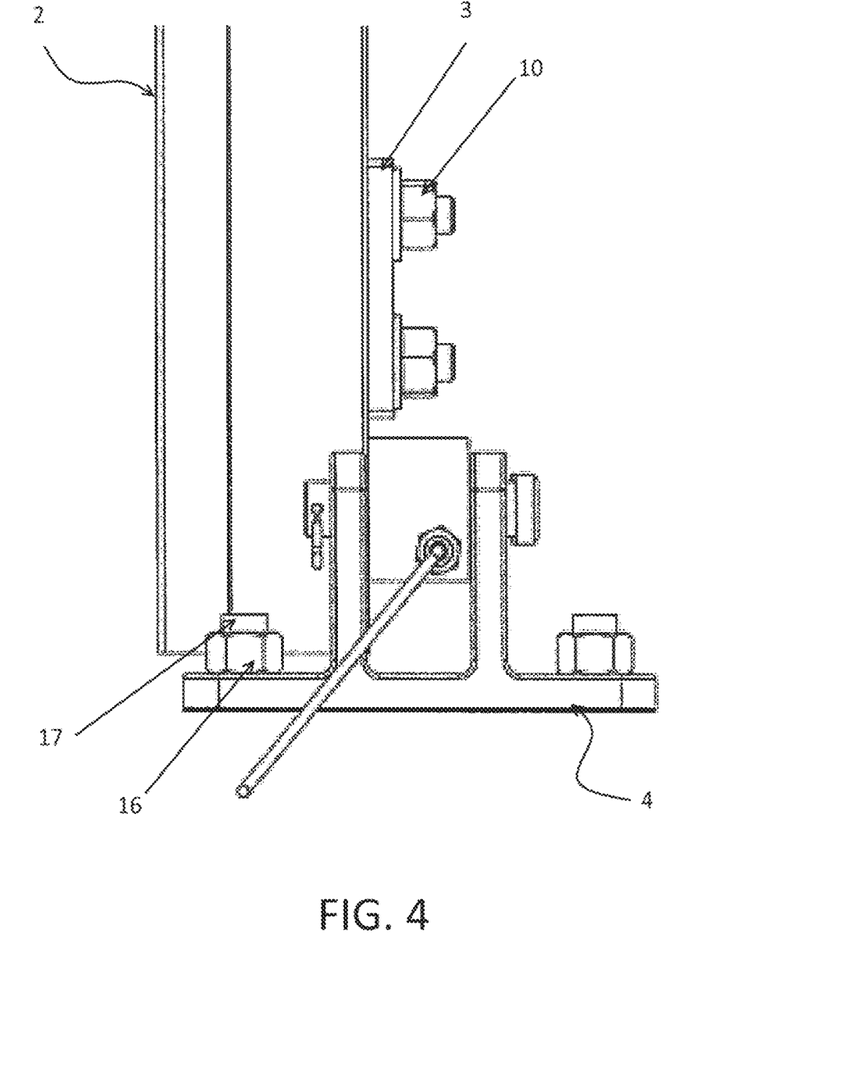
FIG. 4 is a side view of an apparatus to monitor the weight contained in a tank in accordance with the principles of the present invention.

Referring to FIGS. 1A and 1B representing a preferred embodiment, the load cell assembly 101 comprises a load cell 1, load cell supports 4, strain measurement systems, such as strain gauges 6, front and rear reinforcing members, such as reinforcing plates 3 and 5, and retainer members 7, such as pins.

Still referring to FIGS. 1A and 1B, two strain measurement systems 6 are attached on both sides of the load cell to measure the maximum shear deformation of the load cell material. The load cell 1 is typically supported by load cell supports 4 that solidly attached to an anchor, such as a concrete, a stake or any other mean of anchoring a load cell support. In a preferred embodiment, the load cell supports are screwed to the concrete using concrete anchors 17 and attaching means 16, such as nuts.

Now referring to FIGS. 1, 3, 5 and 8, in a preferred embodiment, the load cell 1 may comprise apertures or holes 21 adapted to receive a mean for retaining the lifting of the reservoir, such as pins 7, a center threaded hole 20 adapted to receive an attachment mean such as but not limited to a main bolt 11, and a preferably threaded hole 18 adapted to receive a jacking or lifting mechanism 19, such as a screw. The pins 7 may be inserted through holes 22 of the load cell supports 4 and through holes 21 of the load cell 1 to retain the load cell 1 in place once being in a lifted position.

Referring now to FIGS. 1A and 1B, in a preferred embodiment, the tank support member 2, such as a leg, may comprise three holes aligned with the longitudinal direction of a tank leg 2. In such an embodiment, the two superior holes are used to attach two reinforcing members 3 and 5, such as reinforcing members, at the front and rear of the tank support member 2, respectively. To attach the plates, two sets of attaching means are used, such as but not limited to bolt 8, washer 9 and nut 10.

Figure 5:
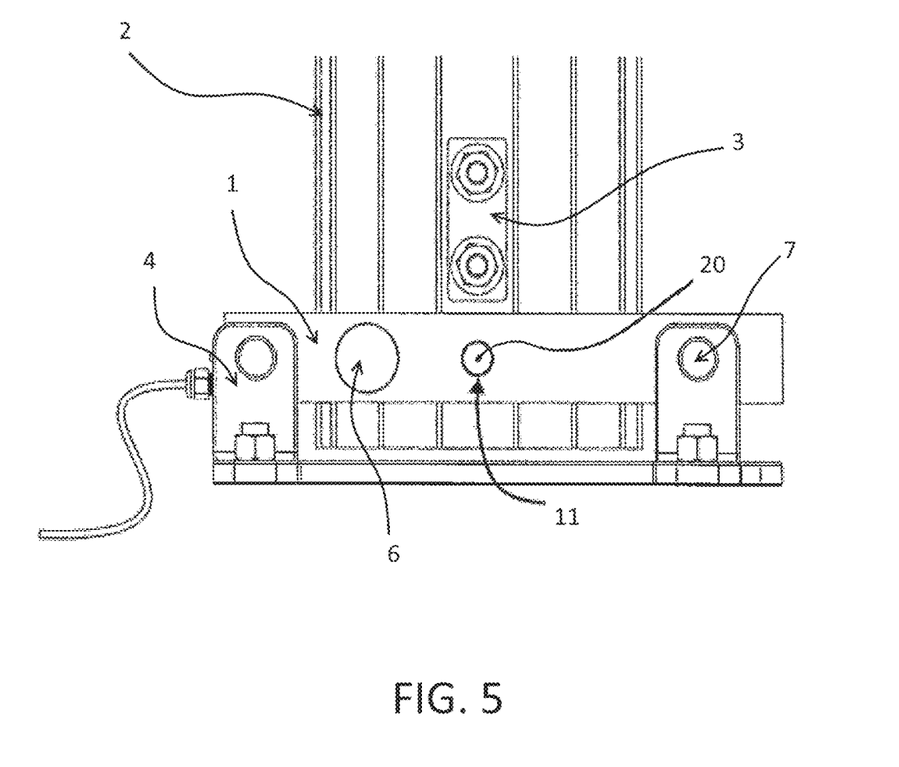
FIG. 5 is a front view of an apparatus to monitor the weight contained in a tank in accordance with the principles of the present invention.
Figure 6:
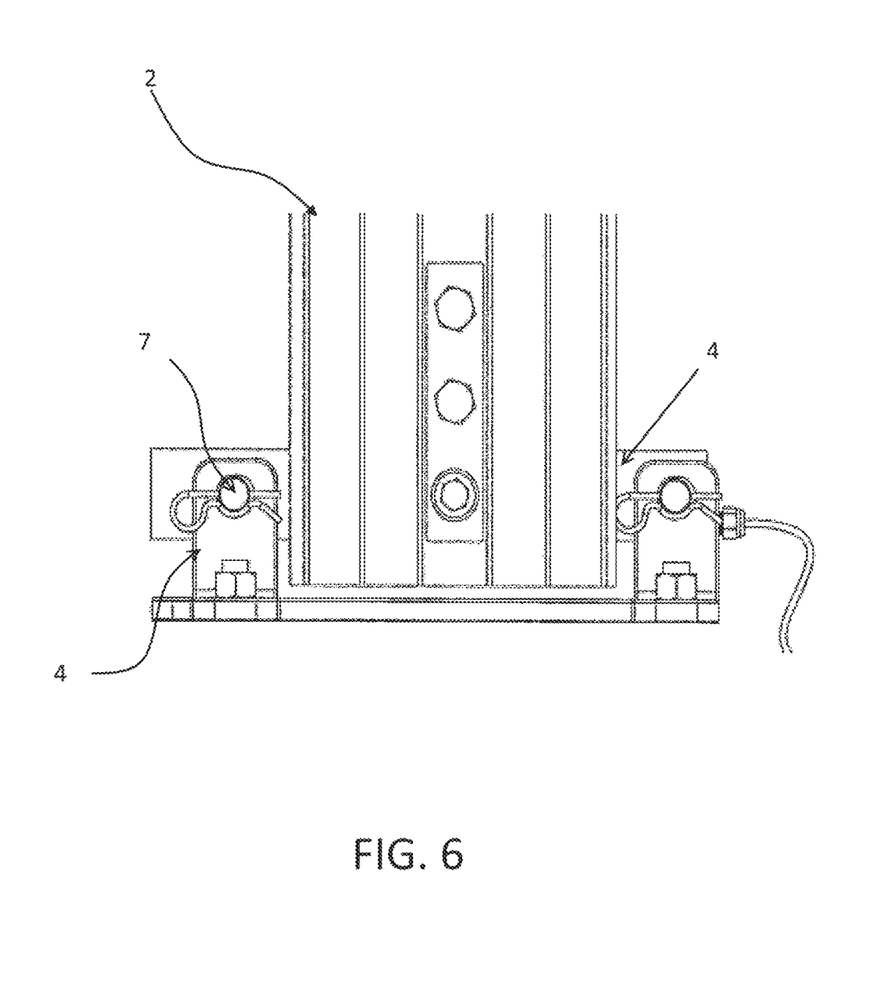
FIG. 6 is a rear view of an apparatus to monitor the weight contained in a tank in accordance with the principles of the present invention shown in a lifted position.

Now referring to FIGS. 1A, 1B, and 5, the load cell 1 is shown in an un-lifted position. The apparatus 1 is pivotally attached to the tank leg or support 2 using any attachment mean 11. In a preferred embodiment, a bolt 11 is screwed through a center threaded hole 20 of the load cell 1, through the remaining bottom hole of the support member 2, and, finally through a third bottom hole in the rear reinforcing plate 5. Understandably, any other mean for attaching the apparatus 1 to the support member 2 could be used.

Now referring to FIGS. 7A to 7D and 8, the load cell 1 is shown in the lowered position. The load cell 1 is pivotally connected to at least one extremity of the load cell supports 4. In a preferred embodiment, one hole 21 of the load cell 1 is attached to the load cell support 4 using a pin 7. Still in a preferred embodiment, a lifting device, such as a jack screw 19 is screwed through the threaded hole 18 in order to lift the load cell 1 and the attached support member 2 until the remaining hole 21 of the load cell 1 becomes aligned with the holes 22 of the load cell support 4. The remaining pin 7 is then inserted through holes 21 and 22 to lock the load cell in place. Preferably, the jack screw 19 may then be removed. Understandably, other mean of pivotally attaching the load cell 1 to the load cell support may be used and the invention is not limited to the preferred embodiment.

Figure 7A:
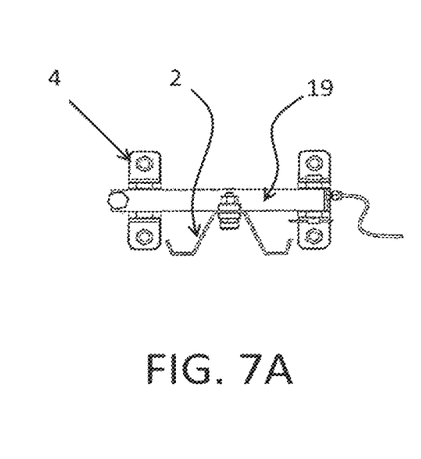
FIG. 7 is a top view of an apparatus to monitor the weight contained in a tank in accordance with the principles of the present invention shown in an un-lifted.
Figure 7B:
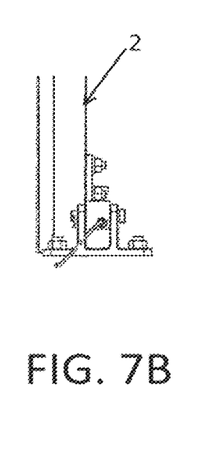
FIG. 7B is a left side view of the apparatus of FIG. 7A.
Figure 7C:
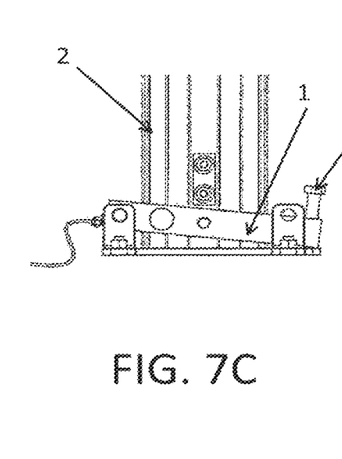
FIG. 7C is a front view of the apparatus of FIG. 7A.
Figure 7D:
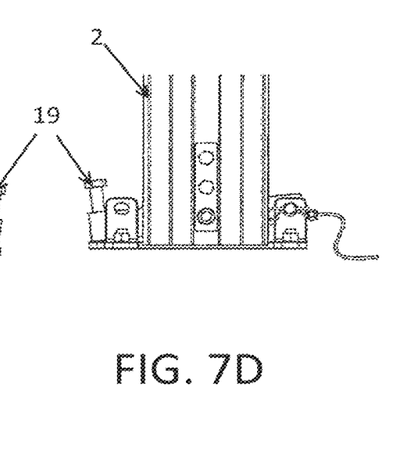
FIG. 7D is a rear view of the apparatus of FIG. 7A.
Figure 8:
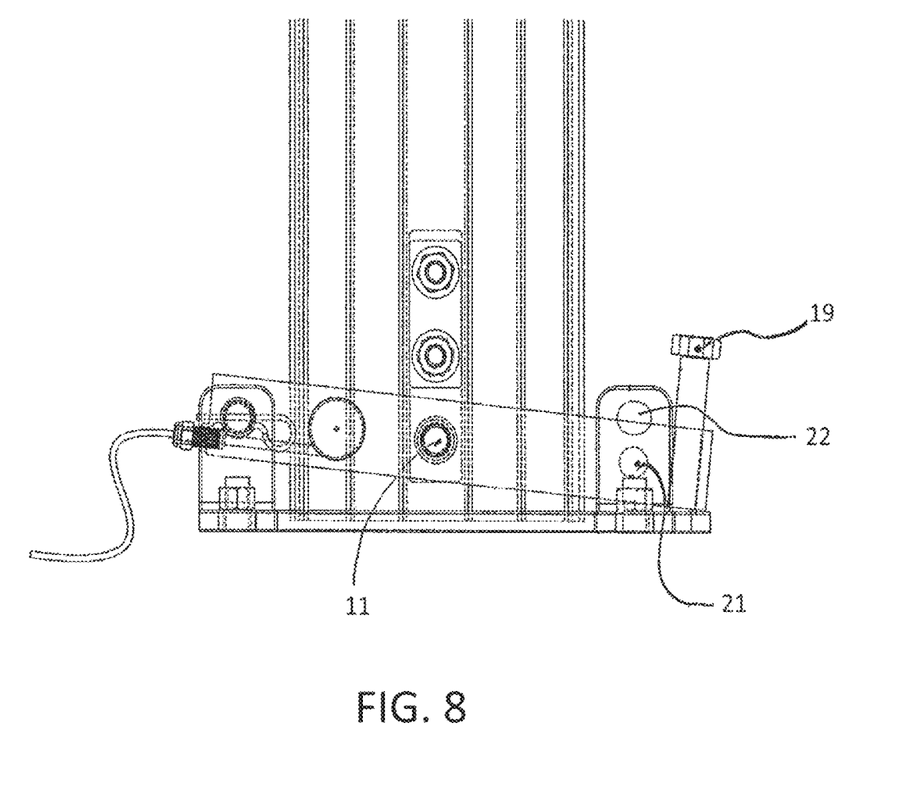
FIG. 8 is a front view of the apparatus to monitor the weight contained in a tank in accordance with the principles of the present invention shown in the un-lifted position.

The jacking mechanism 19 typically acts as an integrated mean for lifting the container or silo. However, such mechanism 19 is required during the lifting phase. When the silo is sufficiently raised, the mean for retaining the raised silo 7 is installed to maintain the height of the silo. When the weight is supported by the mean for retaining 7, the jacking mechanism may then be safely removed if needed.

The lifting device aims at acting as a lever to raise the load cell 1, as the load cell 1 is pivotally connected to the tank leg 2. Accordingly, as the weight is applied about the center of the load cell, the force required to be applied to the free extremity of the load cell to lift the silo leg 2 generally corresponds to half of the weight of the silo leg 2. To that extend, the closer to the pivoting extremity the weight is applied, the less force needs to be applied to the free extremity to lift the silo leg 2.

In other embodiments, the load cell 1 may be pivotally attached to the tank leg 2 for the lifting device to act as lever. Understandably, the pivotal attachment may be positioned anywhere between the sides of the tank leg 2 to adapt the lever ratio.

Figure 9:
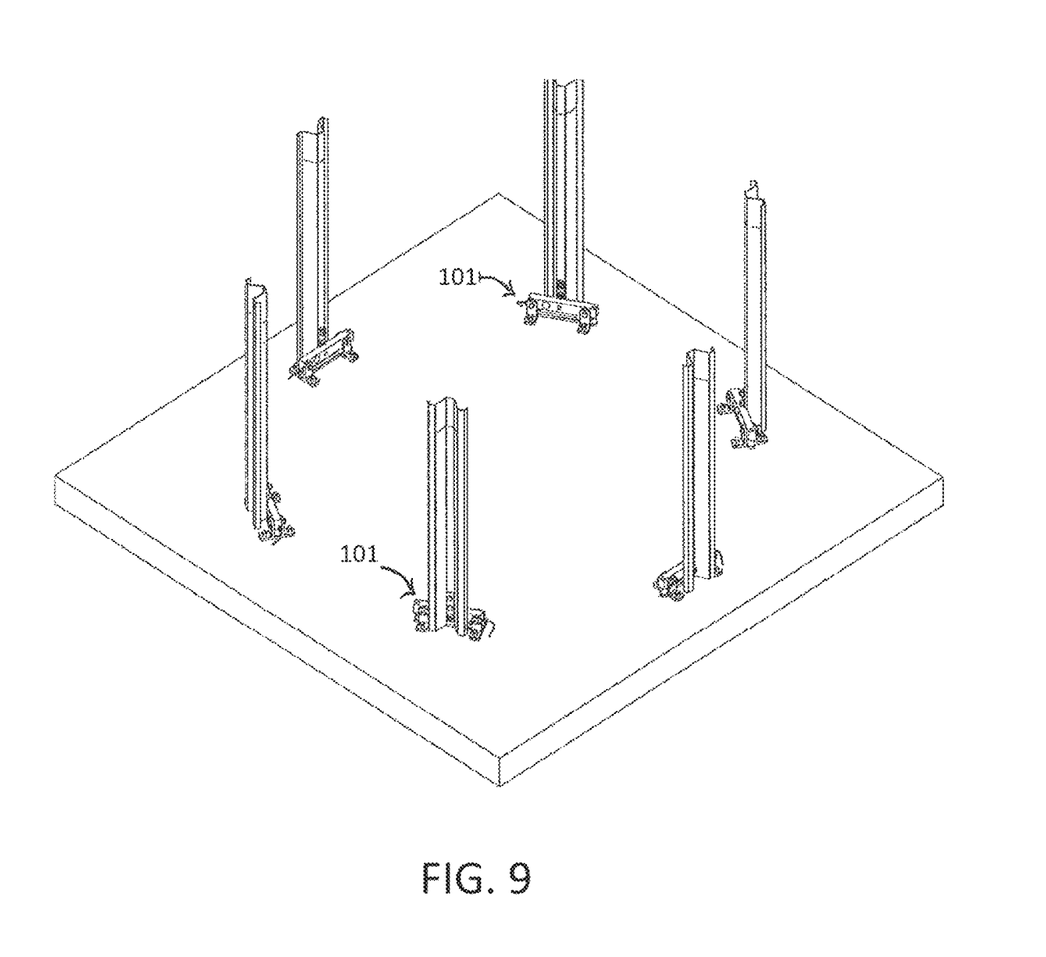
FIG. 9 is a perspective view of the system comprising a plurality of an apparatuses to monitor the weight contained in a tank in accordance with the principles of the present invention; an apparatus being installed on each leg of a silo.

Now referring to FIGS. 1 and 9, the whole weight of the tank or silo is then supported by a plurality of load cell assemblies A. The weight of the silo causes deformation of the load cells 1 that induces a variation in the electric or optical signal measured by the strain gauge 6. Using monitoring device and techniques known in the art, the variation in electric or optical signal is than translated into a force. The weight of the silo is then computed by adding the force measured by each load cell.

Still referring to FIGS. 1 and 9, the method to weight and lift a tank or silo comprises the steps of attaching the load cell 1 to the support member 2 of the reservoir, such as using a main bolt 11, attaching at least one strain measurement system 6, such as strain gauge, to said load cell 1, lifting said load cell 1 and the support member 2 of the reservoir using a rising mechanism or means, such as a jack screw 19, repeating the previous steps for each support member 2 of the reservoir, measuring the variation in an output signal, such as an electric or optical signal, of said strain measurement system 6 of each support member 2 of the reservoir and computing the variation of the output signal.

The step of computing the variation of the output signal may be realized using any type of controller or computer device. The step may further comprise translating the output signal into human readable data.

Figure 10:
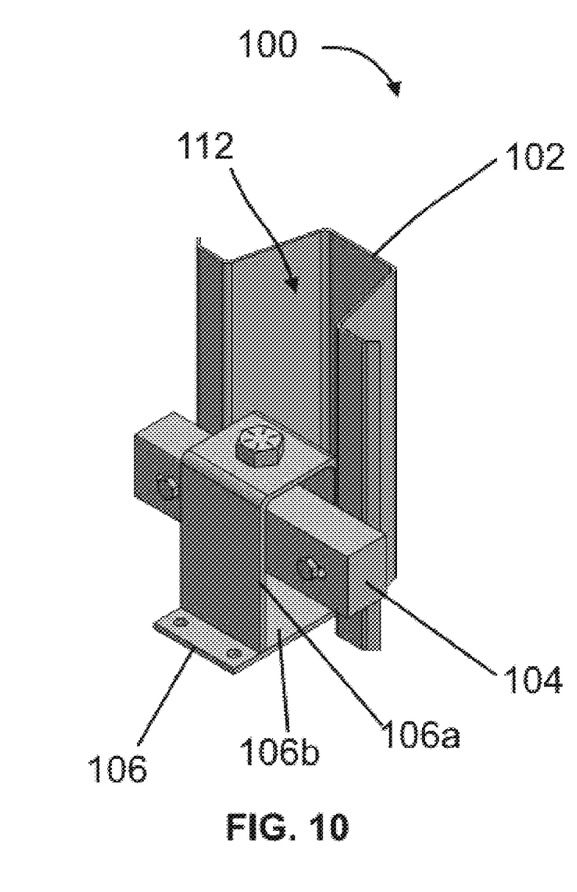
FIG. 10 is a perspective view of a second embodiment of an apparatus to monitor the weight contained in a structure in accordance with the principles of the present invention.
Figure 11:
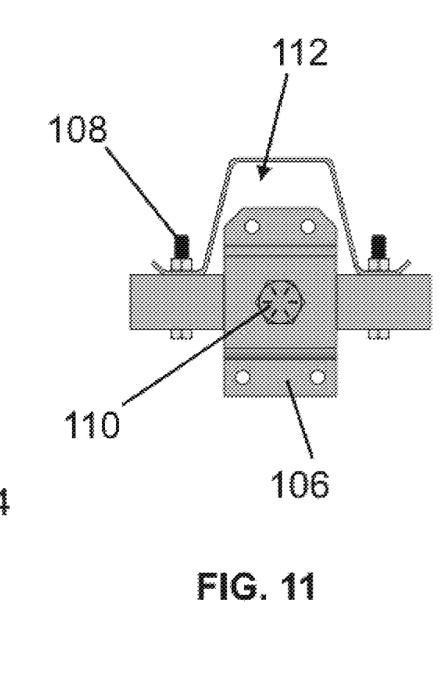
FIG. 11 is a top view of the apparatus of FIG. 10.
Figure 12:
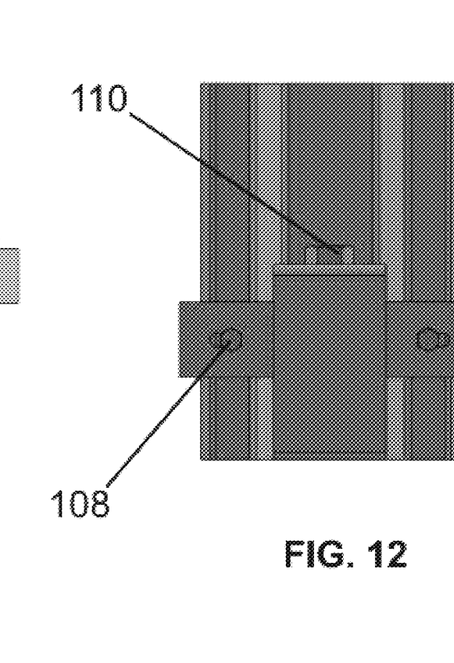
FIG. 12 is a front view of the apparatus of FIG. 10.
Figures 13, 14, 15, 16:
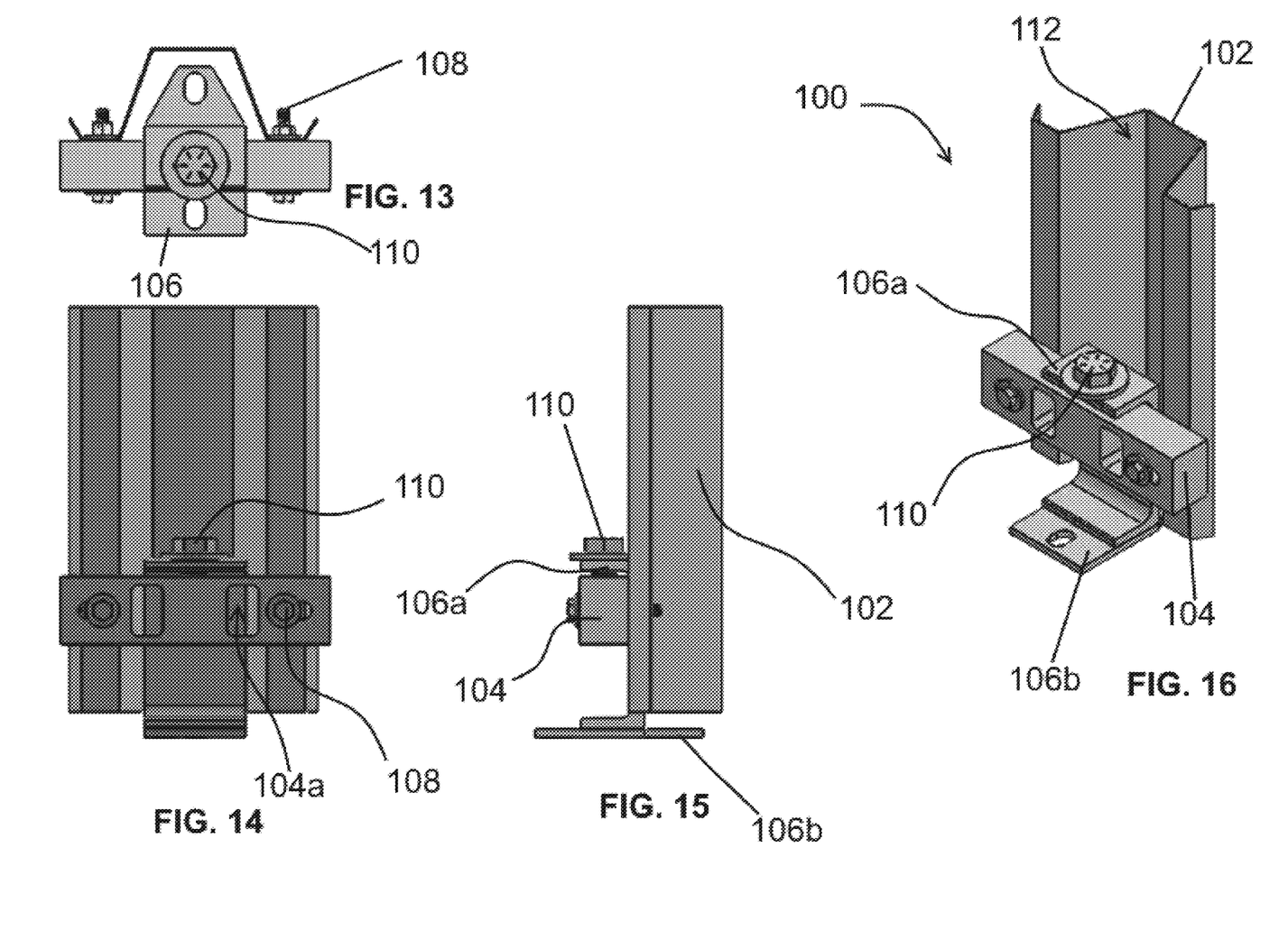
FIG. 13 is a top view of another embodiment of an apparatus to monitor the weight contained in a structure in accordance with the principles of the present invention.
FIG. 14 is a front view of the apparatus of FIG. 13.
FIG. 15 is a right plan view of the apparatus of FIG. 13.
FIG. 16 is a perspective view of the apparatus of FIG. 13.

Now referring to FIGS. 10 to 12 representing a second embodiment of the system 100, the system 100 is adapted to lift a support member 102 of the silo. Such system is preferably connected to each support member 102 of the silo. A support member 106 of the system is preferably fixedly connected to the ground. Preferably, the support member 106 has an "n" shape portion 106a and a flat portion 106b connected together. The support member 106 allows insertion of the load cell 104. The load cell 104 is operatively connected to the support member 102 of the reservoir using fasteners such as bolts 108. Understandably, any means know in the art to attach the load cell 104 to the support member 102 may be used. According to the present embodiment, the support member or tank leg 102 typically comprises a concave portion 112 adapted to receive the support member 106, as illustrated in FIG. 11.

In a preferred embodiment, the load cell support member 106 and the load cell 104 may each comprises an aperture adapted to receive a mean 110 to induce movement in the load cell, such as a bolt. In embodiments using a bolt, the aperture of the load cell 104 is preferably threaded to induce a movement of the load cell along the axis of the bolt means to induce movement 110 upon rotation of the bolt 110.

The mean 110 to induce movement in the load cell typically acts as an integrated mean for lifting the container or silo. Once the load cell 104 is raised to desired height or position, the pressure induced by the bolt 110 between the support 106a and the load cell 104 creates a rigid connection. The rigid connection generally aims at preventing an oscillatory movement induced by lateral forces on the reservoir or tank, such as wind.

In other embodiments, the aperture in the load cell 104 may not be threaded and a nut may be inserted to the free extremity of the bolt 110 below the load cell 104. In such a case, the rotation of the bolt 110 with regards to the nut may be limited to allow movement of the load cell 104 along the axis of the bolt 110.

The strain measurement systems, such as strain gauges, are operatively attached to the load cell 104. The deformation of the load cell 104 creates a variation in a signal outputted by the strain gauge. The variation in the output signal is computed in a force using a monitoring device and techniques know in the art. The weight of the reservoir is then computed by adding the force measured by each load cell 104 of each leg 102.

A method to lift and weight a reservoir is provided. The method preferably comprises attaching the extremities of the load cell 104 to the support member 102 of the reservoir, attaching at least one strain measurement system, such as a strain gauge, to the load cell 104, lifting the load cell 104 and the support member 102 of the reservoir using a lifting mean, such as a bolt 110 that is inserted in an aperture of the load cell 104, repeating the previous steps for each support member of the silo, measuring the variation signal output by the strain measurement system of each support member 102 of the reservoir and computing variation in the output signal electric or optical signal.

The method may further comprise the steps of attaching a support member 106 to the ground and adjacent to a silo leg 102 before the step of attaching the extremities and inducing movement in the load cell using the lifting mechanism, such as a bolt 110.

In the present embodiment, when the support member 102 is lifted from the ground, the means for inducing movement in the load cell or bolt 110 is in tension. Accordingly, to avoid any structural failure of the said mean 110, a supporting device may be inserted below the load cell 104 to maintain the silo leg 102 above the ground and to maintain the weight of the silo on the load cell 104. The supporting device may be a block preferably made of metal that is preferably not subjected to deformation under the weight of the silo. Such block may be inserted below the load cell when the load cell 104 and the tank supporting member 102 are raised to a desired or maximum position in order to release the tension applied in the lifting bolt 110.

Now referring to FIGS. 13 to 16, another embodiment is illustrated. The system 100 differs from the second embodiment as the support member 106 has a generally "r" or "c" shape portion 106a instead of a generally "n" shape. The support member 106 further comprises a flat portion 106b which preferably lies on the ground to support the weight of the silo leg 102.

Still referring to FIGS. 13 to 16, the load cell 104 may further comprise hollow portion(s) 104a. Such hollow portions(s) typically aim at reducing the weight and/or at allowing greater deformation under the weight of the silo leg 102. In some situations, the weight of the silo leg 102 may be difficult to estimate if the force produced by such weight does not induce a flexion in the load cell 104. The strain gauge (not shown) may undergo a force that is not sufficient to be accurately numerically translated in a weight value. Such strain gauge is typically affixed to the load cell 104.

Understandably, any shape and/or features adapted to support a flexion load may be used without departing from the scope or principles of the present invention.

In a further embodiment, the supporting member 106 of the system may be excluded. Both extremities of the load cell 104 are attached to the supporting member 102 of the reservoir. In a rest position, both the support member 102 and the load cell 104 preferably contact the ground. The load cell 104 may be provided with a threaded aperture adapted to receive a lifting mechanism, such as a bolt 110.

In embodiments using a bolt, the bolt 110 is to move the load cell 104. In operation, once the free extremity of the bolt 110 reaches the bottom of the load cell, the bolt 110 pushes against the ground and lifts the load cell 104 and the support member 102 of the reservoir. Contrary to the other embodiments where the bolt 110 supports the weigh in tension, the bolt 110 supports the weight in compression.

By attaching the load cell close to the ground, the length of the bolt 110 or system to induce movement, which is located between the ground and the bottom of the load cell, is reduced. Such reduced length of the bolt 110 aims at minimizing the risk of buckling of the bolt 110.

When the support member 102 of the reservoir has a height for which all the weight of the reservoir is supported by the load cell 104, a supporting device, such as a block preferably made of metal, may be inserted below the load cell 104 and the bolt 110 may be relaxed or removed.

Figure 17:
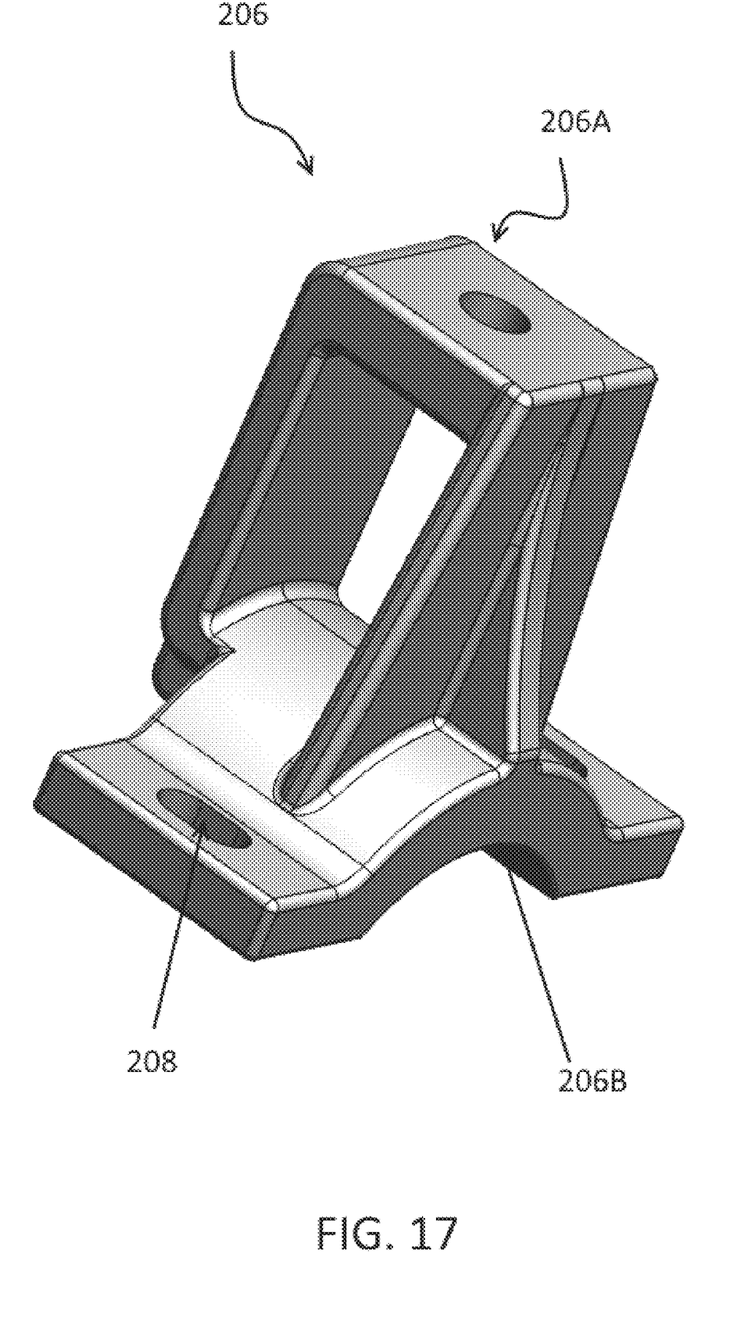
FIG. 17 is a perspective view of another embodiment of a cell load support of the apparatus to monitor the weight contained in a tank in accordance with the principles of the present invention.

In yet another embodiment, as shown in FIG. 17, the load cell support 206 may be adapted to comprise a generally "n" shape portion 206a and a partially curved portion 206b connected together. The support member 206 allows an easier insertion of the load cell 104. Thus, such a configuration does not require removing the anchoring means originally presents on the supported structure while installing the measurement means. Further, such a configuration of the load cell support allows attaching directly the load cell to the support member of the structure without using an adapting auxiliary member.

Still referring to FIG. 17, the load cell support 206 may comprise different size and forms of apertures 208 adapted to receive different fasteners.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art

The invention claimed is:

1. A system for monitoring and supporting the weight of a structure above a surface, the structure comprising at least two supporting members, the system comprising:
   a load cell support, the load cell support being anchored to the surface;
   a beam load cell, each of two ends of the beam load cell being attached to one of the supporting members;
   a lifting device linking the load cell support to the beam load cell between the two ends, the lifting device upwardly or downwardly moving the beam load cell; and
   at least one sensor for measuring deformation of the beam load cell.

2. The system of claim 1, the lifting device being in between the two ends of the beam load cell and in between sides of the supporting element of the structure.

3. The system of claim 1, the system further comprising a monitoring device for converting the deformation of the load cell measured by the sensor in a signal transducing the weight of the structure.

4. The system of claim 1, the first and second ends of the beam load cell being the first and second extremities of the beam load cell.

5. The system of claim 1, the load cell support being received by a hollow portion of the supporting member.

6. The system of claim 1, the lifting device comprising a bolt inserted in a threaded aperture between the two ends of the beam load cell.

7. The system of claim 1, the lifting device creating a rigid connection with the supporting member.

8. The system of claim 1 further comprising a rigid member supporting the beam load cell in a lifted position.

9. The system of claim 1, the beam load cell comprising two deformation zone between each of the attachments to the supporting member, the lifting device being attached between the two deformation zones.

10. The system of claim 1, the load cell support being C-shaped.

11. The system of claim 1, the load cell support being n-shaped.

12. A method for monitoring and supporting the weight of a structure comprising at least one supporting element above a surface, the method comprising:
- attaching a first section of the load cell to a first portion of the support element of the structure;
- attaching a second section of the load cell to a second portion of the support element of the structure;
- using a lifting device to upwardly move the load cell with respect to a load cell support attached to the surface;
- measuring deformation of the load cell; and
- calculating load of the supporting element using the deformation of the load cell.

13. The method of claim 12, the method further comprising converting the measured deformation in a signal transducing the weight of the structure.

14. The method of claim 12, the structure comprising more than one supporting member, the method further comprising repeating all steps for each support element of the structure.

15. The method of claim 12, the method further comprising locking the load cell in a position to create a rigid connection with the support member.

16. The method of claim 12, the method further comprising maintaining the load cell at a lifted position using a maintaining means.

17. The method of claim 16, wherein maintaining the load cell at a lifted position further comprises inserting a rigid member under the load cell.

* * * * *